United States Patent [19]

Valyi

[11] 3,994,649
[45] Nov. 30, 1976

[54] APPARATUS FOR MAKING PLASTIC CONTAINERS

[76] Inventor: Emery I. Valyi, 5200 Sycamore Ave., Riverdale, N.Y. 10471

[22] Filed: Mar. 25, 1974

[21] Appl. No.: 454,387

[52] U.S. Cl. .................. 425/242 B; 425/387 B; 425/DIG. 208; 425/DIG. 234
[51] Int. Cl.² ............................ B29D 23/03
[58] Field of Search .......... 425/DIG. 208, DIG. 209, 425/DIG. 234, 326 B, 387 B, 242 B

[56] References Cited
UNITED STATES PATENTS

| | | | |
|---|---|---|---|
| 2,298,716 | 10/1942 | Moreland et al. | 425/163 |
| 2,792,593 | 5/1957 | Hardgrove | 425/DIG. 208 |
| 2,913,762 | 11/1959 | Knowles | 425/249 |
| 3,029,468 | 4/1962 | Valyi | 425/181 |
| 3,283,046 | 11/1966 | DeWitt et al. | 425/DIG. 208 |
| 3,321,564 | 5/1967 | Dobbins et al. | 425/DIG. 208 |
| 3,717,544 | 2/1973 | Valyi | 156/242 X |
| 3,719,735 | 3/1973 | Valyi | 264/89 |
| 3,770,860 | 11/1973 | Amberg et al. | 425/DIG. 208 |
| 3,850,562 | 11/1974 | Takevchi et al. | 425/DIG. 208 X |
| 3,878,282 | 4/1975 | Bonis et al. | 425/DIG. 209 |
| R27,104 | 3/1971 | Valyi | 425/326 |

Primary Examiner—Ronald J. Shore
Assistant Examiner—Carl Rowold
Attorney, Agent, or Firm—Robert H. Bachman

[57] ABSTRACT

A method and apparatus for the production of plastic containers, especially injection blow molded containers having a preformed inner lining which is applied to the blow core prior to formation of the composite parison. The temperature of the blow core is adjusted prior to application of the lining so that it is suitable for receiving and heating said lining.

5 Claims, 10 Drawing Figures

APPARATUS FOR MAKING PLASTIC CONTAINERS

BACKGROUND OF THE INVENTION

This invention relates to the preparation of plastic containers, especially composite parisons having a preformed inner sleeve or lining, said parisons being useful in the formation of composite blow molded containers as described in my prior U.S. Pat. Nos. 3,719,735 and 3,717,544. According to said patents, previously formed sleeve-like liners are applied to a blow core of an injection blow molding apparatus, plastic is injected around said liners while upon the cores and the resultant composite parison, consisting of the liner and the injected plastic, is expanded together into conformance with a blow mold. The method of injection blow molding is well known and described, for example, in U.S. Pat. No. 3,029,468 and others.

It is highly desirable to adjust the temperature of the blow core so as to condition the blow core to render it suitable for receiving and heating the preformed sleeve prior to injection of plastic therearound. One may provide the core with internal heating coils, or heat exchange fluid channels, or make the core of a good heat conductor to minimize temperature gradients therein; however, it is often found that these expedients render the core and core assembly mechanically cumbersome and subject to damage.

Accordingly, it is a principal object of the present invention to provide a process and apparatus for making plastic containers, especially composite containers having an inner lining applied to a core prior to the formation of the composite.

It is a further and particular object of the present invention to provide a process and apparatus as aforesaid which enables adjustment of the core temperature and conditioning of the core prior to application of the liner thereon in a simple, convenient and expeditious manner suitable for commercial operation.

Further objects and advantages of the present invention will appear from the ensuing specification.

SUMMARY OF THE INVENTION

In accordance with the present invention, it has now been found that the foregoing objects and advantages may be readily obtained. The method of the present invention relates to a method of making hollow plastic containers wherein a parison is formed on a core in a parison mold by molding the plastic around the core in the parison mold cavity and subsequently expanding the parison in a blow mold. The improvement of the present invention resides in adjusting the temperature of the core so as to condition the core prior to forming the parison by heating the core externally at a heating station, particularly by means of contact elements. The present invention is particularly advantageous in the formation of composite containers by applying a preformed plastic sleeve to the core after said heating step, injecting the plastic around the sleeve and core and expanding the sleeve and core together in a blow mold.

The apparatus of the present invention includes a parison mold, a core on which the parison is to be formed separable from the parison, means molding the plastic onto the core in the parison mold, a blow mold to which the parison can be transferred and means for externally heating said core when said core is separated from the parison mold to adjust the core temperature. The apparatus is particularly advantageous in the manufacture of lined containers wherein it includes supply means for supplying a formed sleeve to the core while separated from the parison mold, but after said external heating.

BRIEF DESCRIPTION OF DRAWINGS

The nature of the invention will be better understood from the following description taken in connection with the accompanying drawings in which specific embodiments have been shown for purposes of illustration.

In the drawings.

DETAILED DESCRIPTION

Figure 1A:
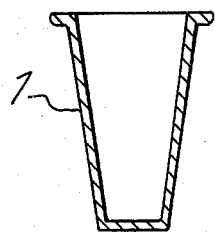
FIGS. 1a to 1e are elevations, partly in section, showing elements of the apparatus of the present invention and steps of the process of the present invention.
Figure 1B:
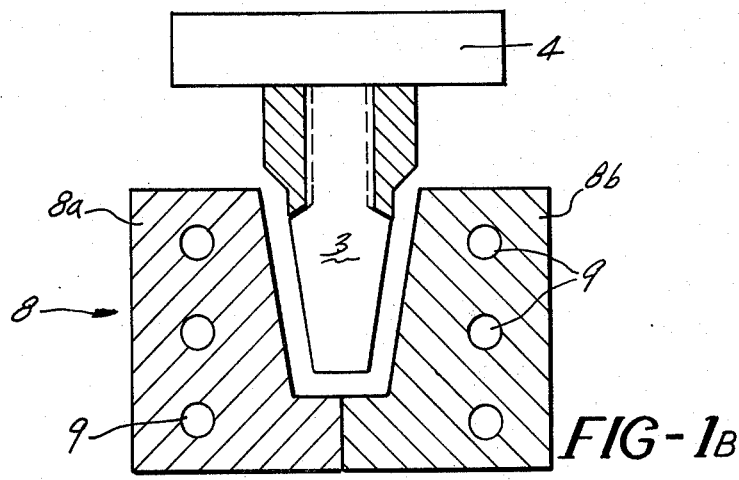
Figure 1C:
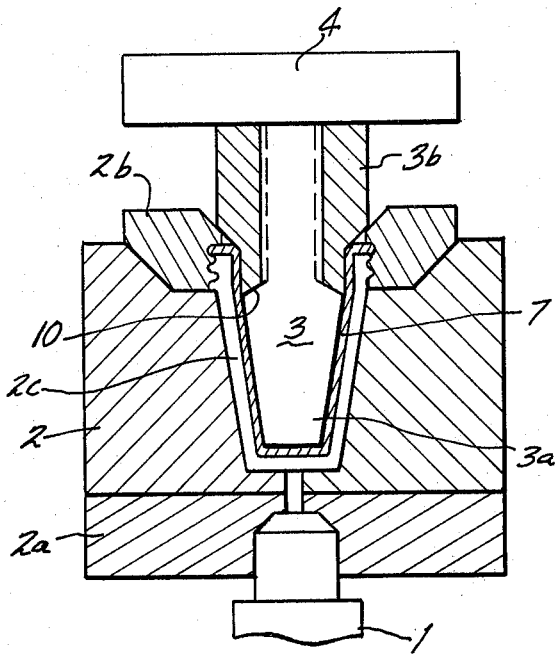
Figure 1D:
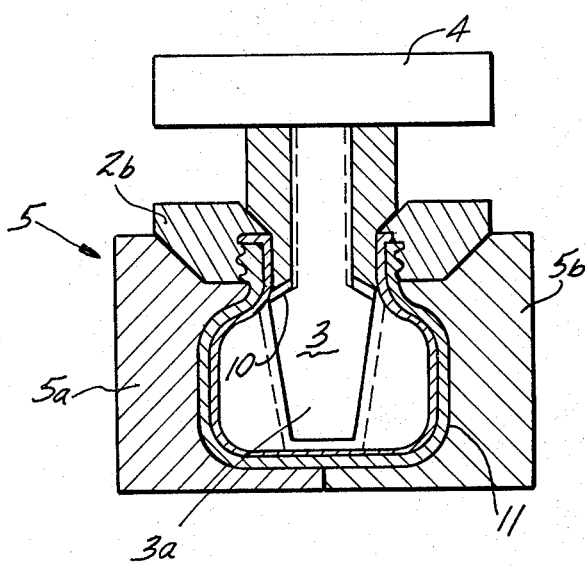
Figure 1E:
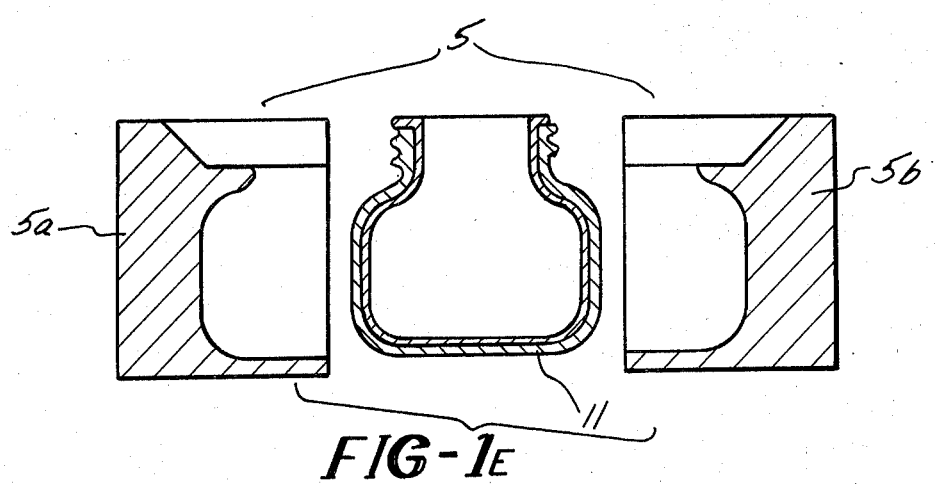

Referring to the drawings in more detail, the elements and steps of the present invention are shown in FIG. 1 in which an extruder or other known injection unit 1 provides hot molten plastic under pressure to a parison mold assembly. The parison mold assembly consists of the parison mold 2 which communicates with the injection unit 1 by means of runner plate 2a, a neck or rim mold 2b and the core 3 (which is usually a blow core) whereby the parison mold 2, the neck mold 2b and the core 3, when assembled as shown, form the parison mold cavity 2c between them. Alongside the parison mold assembly, FIG. 1 also shows a blow mold assembly comprising a blow mold 5 and the neck mold 2b and core 3 previously referred to in conjunction with the parison mold assembly.

In operation, a liner 7 is applied to the core 3 before said core is placed into parison mold 2. The core, together with the liner, is introduced into the parison mold together with neck mold 2b and the assembly clamped firmly together by a force transmitted through platen 4. Hot plastic is then pressed into the parison mold cavity from extruder 1 through runner plate 2a, around the sleeve 7 which is on the core 3. A parison is thus molded forming a composite structure the inner layer of which is comprised of the material of the sleeve 7 while its outer layer consists of the material pressed around that sleeve from the extruder 1.

In accordance with the present invention, the core 3 is conditioned prior to receiving the sleeve 7 by adjusting the temperature of the core to render it suitable for receiving and heating said sleeve. The core temperature is adjusted by applying external heater or contact elements 8 to the core 3 at a conditioning station when the core is separated from parison mold 2 and prior to application of sleeve 7. The external heater may comprise a heater block 8, which may have two or more separable parts 8a and 8b, containing heating elements 9. The heater 8 is preferably made of a good conductor, for example, aluminum. The heater 8 is brought into heating relationship with the core, preferably contacting the core, by mechanical means, not shown in FIG. 1, and left in heating relationship with the core until the core assumes the desired surface temperature. Naturally, if desired, provision may be made to keep certain portions of the core relatively cool. In place of the heaing block 8, one may employ other desired means for externally heating the core at the conditioning station, for example, a suitably shaped conventional radiant or convection heater, a gas burner acting directly on the core, or a stream of hot fluid directed against the core.

Generally, the temperature of the core is affected by the sleeves applied thereto since each freshly applied sleeve will have a tendency to cool the core. The core itself will naturally cool somewhat during the processing cycle. In accordance with the present invention, the core is effectively conditioned to render it suitable for further processing without the mechanically cumbersome expedient of internal core heaters. This is especially advantageous when a sleeve is applied to the core in view of the cooling tendency of a freshly applied sleeve. After the appropriate conditioning of the core 3, the sleeve 7 is promptly applied to the core and the sleeve covered core is inserted into the parison mold for formation of the composite parison as described above.

The parison is then transferred into the blow mold 5 while still on the core 3 and within the neck mold 2b. The core may be provided with an orifice 10 for pressure fluid, usually air. Orifice 10 may be closeable and is shown in the closed position in FIG. 1c and in the open position in FIG. 1d. The core may consist of two components, the plug or poppet portion 3a and the collar or seat 3b, whereby the plug is axially moveable to form a valve opening or orifice 10. In accordance with the present invention, the parison will be hot enough for blowing upon introduction into the blow mold. The parison is then expanded by means of fluid pressure through orifice 10 into conformance with the blow mold to form container 11. The container 11 is removed from the blow mold 5 upon cooling. The blow mold may be constructed in two halves 5a and 5b which may be separated, as shown, releasing the expanded finished article 11 which contains an inner layer representing the liner 7. The parison mold 2 and the neck mold 2b may also consist of more than one part each which may be separable to facilitate the removal of the parison or of the finished article, as shown.

The mechanical operation of the several elements shown in FIGS. 1a to 1e may be carried out by means described in my U.S. Pat. No. 3,029,468 and in numerous other patents, such as, for example, U.S. Pat. No. 2,913,762, U.S. Pat. No. 2,298,716 and others. An apparatus particularly well suited for the purposes of the present invention is described in my U.S. Pat. No. Re. 27,104.

Figure 2:
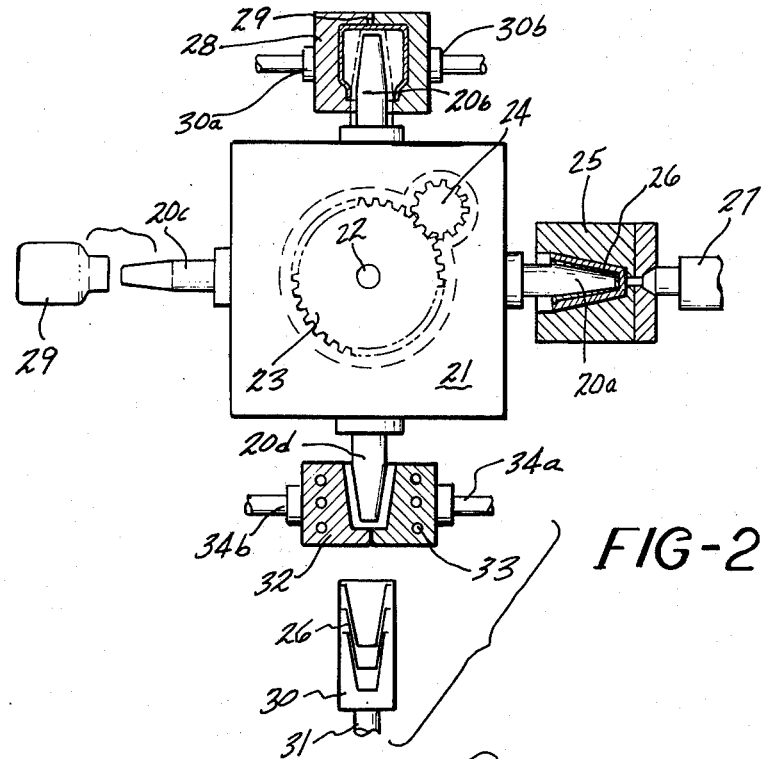
FIG. 2 is an elevation, partly in section, showing a plurality of blow cores moveable in a rotary direction.

Frequently a plurality of blow cores are used as shown in FIG. 2 which provides a plurality of blow cores 20a, 20b, 20c and 20d mounted on a turntable 21 rotating on vertical shaft 22 by driving means 23 and 24. Thus, the blow cores rotate from one station to another, with core 20a being shown at the parison molding station in parison mold 25 covered by liner 26 with injection nozzle 27 in position to inject plastic therearound to form the composite parison. Core 20b is in the blow molding station in blow mold 28, with the composite parison being expanded into composite article 29. The blow mold is shown as being separable by means of pistons 30a and 30b. Core 20c is shown in the article removal station with article 29 being shown separated therefrom. Core 20d is shown in the liner receiving station being conditioned for receiving a liner 26 from liner storage means 30, which is moveable axially by means of piston 31 to apply a liner 26 on core 20d. Core 20d is shown in heating relationship with heating means 32, which contains a plurality of heating coils 33 therein. Heating means 32 is separable by means of pistons 34a and 34b so that the heating means may be removed from core 20d at the moment the core achieves the desired surface temperature so that a liner 26 can be applied thereon and the conditioned core moved to the parison molding station.

Figure 3:
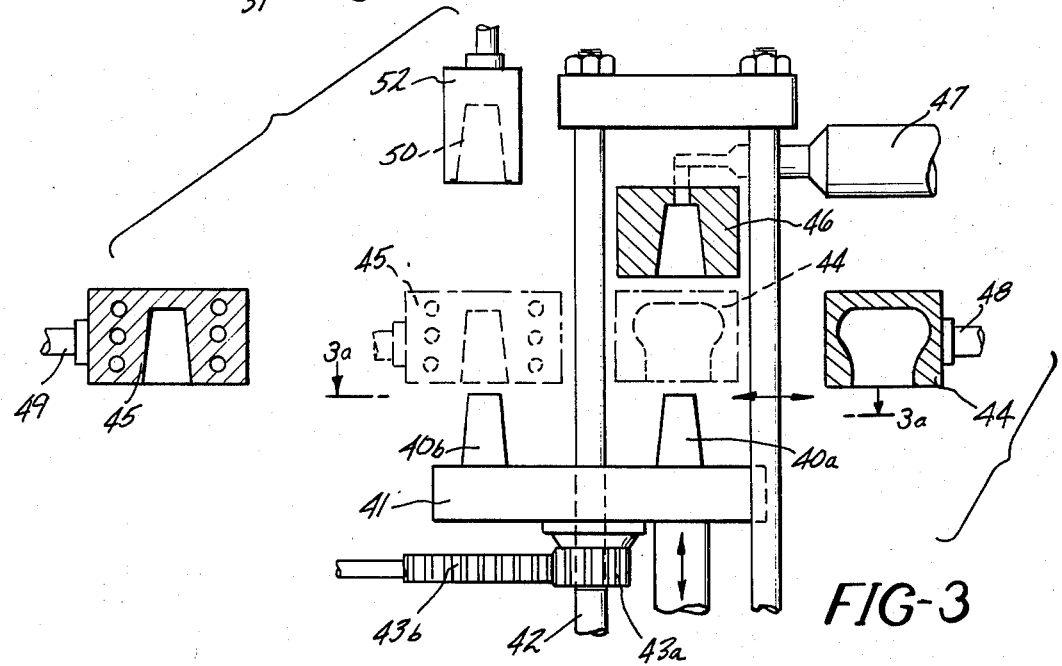
FIG. 3 is an elevation, partly in section, showing laterally moveable blow cores.
Figure 3A:
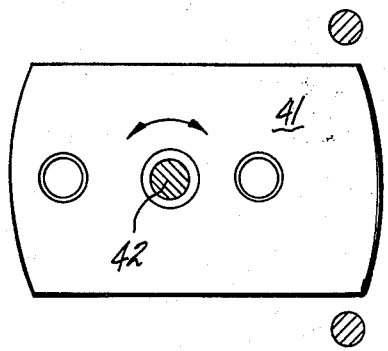
FIG. 3a is a section taken on the line 3a — 3a of FIG. 3.

According to FIGS. 3 and 3a, two blow cores 40a and 40b, or more if desired, are mounted on a common platen 41 which may be rotated or oscillated around shaft 42 by a suitable means, such as by rack 43b acting on pinion 43a moving in the direction of the arrow, which shaft also serves to guide platen 41 in its movements parallel to the axis of the blow cores. As shown in FIG. 3, when blow core 40a is in alignment with blow mold 44, blow core 40b is in alignment with heating means 45. In operation, platen 41 is moved upward in the direction of the arrow and inserted into parison mold 46. The parison is then molded therearound by means of nozzle 47 and the assembly consisting of platen 41 and the two cores 40a and 40b is lowered. A blow mold 44 is moved into juxtaposition with core 40a by means of piston 48, as shown in dot-dash lines and the finished article blown therein. At the same time, heating means 45 is moved into juxtaposition with core 40b by means of piston 49 and the core conditioned as described above. The blow mold with the finished article is removed from the blow core. If a lined parison is to be formed, the liner 50 is applied to the conditioned core by moving magazine 52 into engagement therewith. The assembly consisting of platen 41 and blow cores 40a and 40b mounted thereon is rotated around rod 42 in the direction of the arrow so as to repeat the cycle. Since the time used to expand the parison on one core is also used to condition the other core, valuable production time is conserved.

Figure 4:
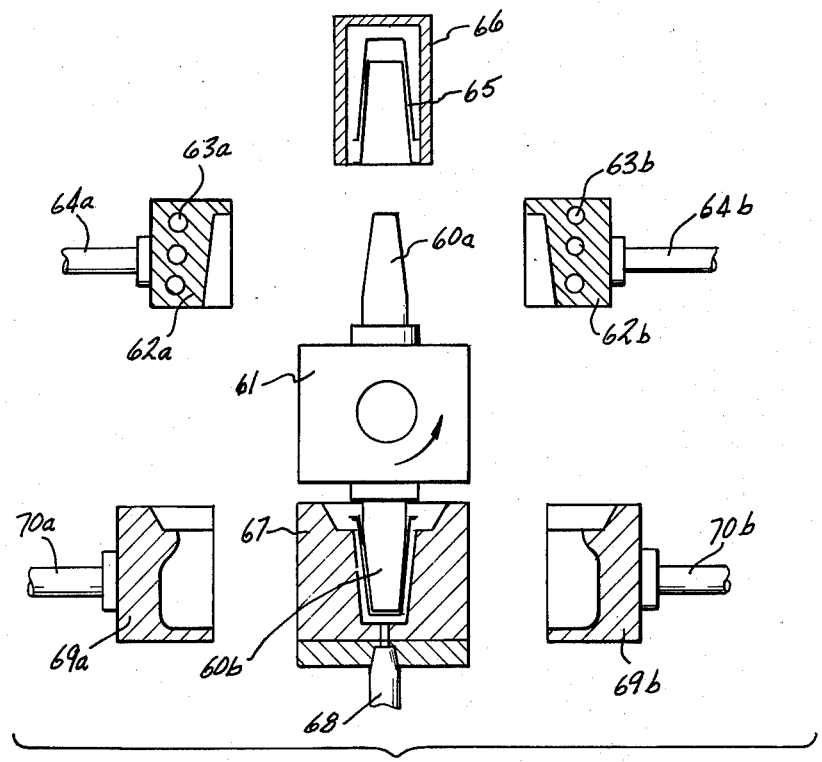
FIG. 4 is an elevation, partly in section, showing the use of two blow cores in a modification of the present invention.

The modification of FIG. 4 shows two cores 60a and 60b mounted on turntable 61 which is rotatable in the direction of the arrow by means not shown so that said cores are moveable from a first position to a second position. Core 60a is shown in the first position wherein said core is conditioned by moving two piece external heating means 62a and 62b containing heating coils 63a and 63b into heating relationship with core 60a by means of pistons 64a and 64b. After core 60a is properly conditioned, the heating means 62a and 62b is moved out of heating relationship by means of pistons 64a and 64b and liner 65 is placed on the conditioned core by moving liner magazine 66 into engagement with core 60a by means not shown. At the same time core 60b is in the second position wherein a parison is molded thereon in parison mold 67 via injection nozzle 68. The parison mold is moved out of engagement with core 60b by means not shown and two piece blow mold 69a and 69b is moved into engagement therewith by pistons 70a and 70b, wherein the composite parison is expanded into the configuration of the blow mold. The blow mold is separated from the expanded article, the article removed and the cycle repeated. It can be seen that the conditioning step is performed conveniently and results in optimized processing.

Figure 5:
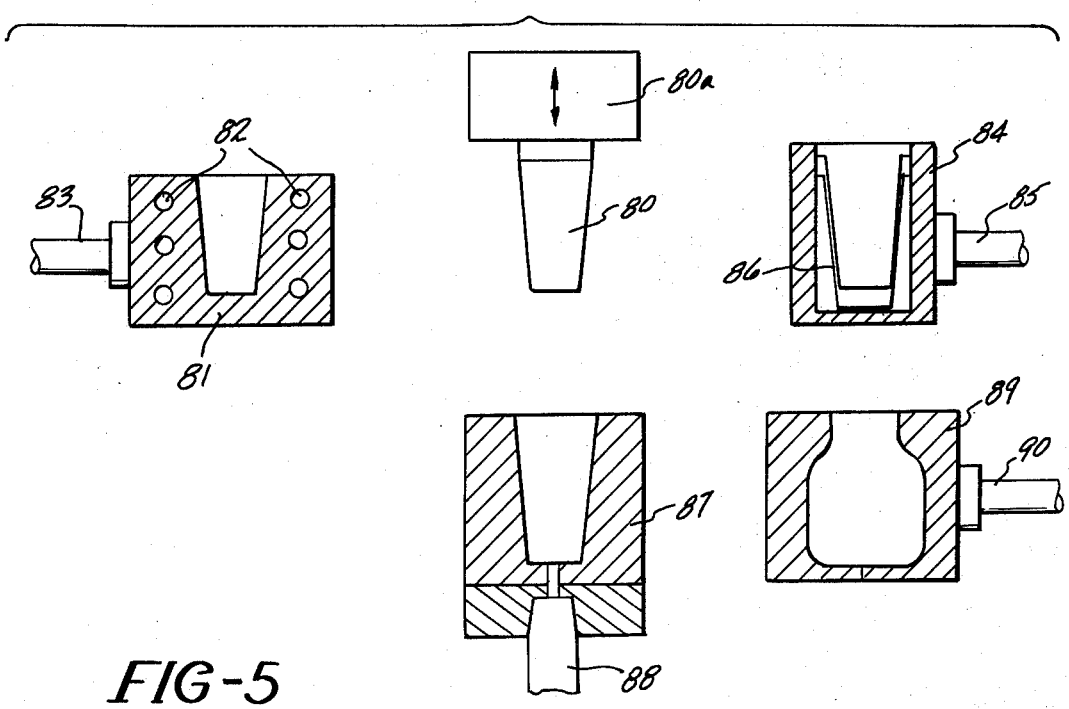
FIG. 5 is an elevation, partly in section, showing a modification of the present invention using a single, axially moveable blow core.

The modification of FIG. 5 shows a single core 80 moveable in the axial direction in the direction of the arrow by platen 80a connected to appropriate actuating means, not shown, so that each step of the present invention is successively performed. Thus, core 80 is moved axially, external heating means 81 containing heating coils 82 moved into the path of core 80 by means of piston 83, core 80 moved into heating relationship therewith and conditioned thereby. The conditioned core 80 is moved axially, heating means 81 moved out of the path of the core and liner magazine 84 moved into the path of core 80 by piston 85 for placing liner 86 thereon. Core 80 is moved into magazine 84 and liner 86 placed on the conditioned core, as by applied suction from the core. The conditioned core 80 plus liner 86 is moved axially out of magazine 84, magazine 84 moved out of the path of the core and core moved axially into parison mold 87 for formation of the composite parison via injection nozzle 88. The parison covered core is moved out of parison mold 87, the parison mold moved away from the path of the core, and blow mold 89 moved into the path of the core by piston 90. The parison covered core 80 is moved into the blow mold 89 for formation of the expanded article. The core is then removed from the blow mold 89, the blow mold moved out of the path of the core so that the expanded article can be allowed to cool and be removed at another station, and the cycle repeated.

A wide variety of materials may be used in the present invention. Thus one may select the material of the liner so as to have one of the properties that the finished article is to have and the material of the injected plastic so as to have another of the desired properties. The liner may contain several layers of laminations to provide a liner having the combined properties of several plastics. Typical materials which may be used for the outer portion include polyolefins, polystyrene, polycarbonate, polyvinyl chloride, etc. Typical liner materials include the acetal polymers, polyolefins, ionomer resins, polyallomer copolymers, polystyrene, polyvinylidene chloride, polyvinyl chloride, polycarbonates, acrylonitrile, etc. It is also possible to produce finished articles having a desirable appearance by providing different colors and degrees of transparency in the liner and the material that is injected therearound.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

I claim:

1. Apparatus for making lined plastic containers or the like in an injection blow molding system using a cool, formed sleeve as a liner which comprises a parison mold and a core on which the parison is to be formed, said core being separable from the parison mold, heating means spaced from the parison mold including contact elements for externally adjusting the temperature of the core, said heating means surrounding said core over substantially all surface areas thereof, means operatively associated with said core and heating means for relatively moving the core and heating means into contacting, heating relationship and leaving said core and heating means in contacting, heating relationship until the core achieves the desired surface temperature without temperature gradients suitable for receiving and heating the liner, supply means spaced from said heating means for supplying said cool, formed sleeve to the core while separated from the parison mold after the core temperature has been adjusted, means operatively associated with said core and parison mold for bringing together the parison mold and sleeve covered core, means associated with said parison mold molding the plastic onto the core in the parison mold, means operatively associated with said core and parison mold separating the core with the sleeve and parison thereon from the parison mold adjacent said parison mold, and a blow mold to which the lined parison can be transferred for blowing.

2. An apparatus according to claim 1 wherein said heating means is a heating block containing a plurality of heating coils, said heating block being moveable into contacting relationship with said core.

3. An apparatus according to claim 1 including a plurality of said cores.

4. An apparatus according to claim 1 wherein said cores are mounted on a turntable and wherein said turntable includes means for rotating said turntable.

5. An apparatus according to claim 1 including means for moving said core.

* * * * *